US009489517B2

(12) United States Patent
Murthy

(10) Patent No.: US 9,489,517 B2
(45) Date of Patent: Nov. 8, 2016

(54) DETERMINING AN ATTACK SURFACE OF SOFTWARE

(71) Applicant: FUJITSU LIMITED, Kawasaki-shi, Kanagawa (JP)

(72) Inventor: Praveen Murthy, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 25 days.

(21) Appl. No.: 14/520,200

(22) Filed: Oct. 21, 2014

(65) Prior Publication Data
US 2016/0110548 A1    Apr. 21, 2016

(51) Int. Cl.
| G06F 21/00 | (2013.01) |
| G06F 21/57 | (2013.01) |
| G06F 9/445 | (2006.01) |
| G06F 17/27 | (2006.01) |
| G06F 17/30 | (2006.01) |
| H04L 29/06 | (2006.01) |

(52) U.S. Cl.
CPC ............. G06F 21/577 (2013.01); G06F 8/60 (2013.01); G06F 17/2705 (2013.01); G06F 17/30867 (2013.01); H04L 63/1433 (2013.01); G06F 2221/033 (2013.01)

(58) Field of Classification Search
USPC .......................................................... 726/25
See application file for complete search history.

(56) References Cited

U.S. PATENT DOCUMENTS

| 7,299,497 | B2 | 11/2007 | Howard |
| 2005/0015624 | A1* | 1/2005 | Ginter ..................... G06F 21/55 726/4 |
| 2006/0047794 | A1* | 3/2006 | Jezierski ............... H04L 67/125 709/221 |
| 2008/0072322 | A1 | 3/2008 | Guruswamy |
| 2008/0189788 | A1* | 8/2008 | Bahl ...................... G06F 21/577 726/25 |
| 2009/0077666 | A1 | 3/2009 | Chen et al. |
| 2012/0054729 | A1* | 3/2012 | Sobel ........................ G06F 8/65 717/169 |
| 2012/0255020 | A1 | 10/2012 | Stoneham et al. |
| 2014/0137257 | A1 | 5/2014 | Martinez et al. |

OTHER PUBLICATIONS

P. K. Manadhata et al; "An Attack Surface Metric" IEEE Transactions on Software Engineering, vol. XX, No. X, Month 2010, pp. 1-17.*
Howard, M., Pincus, J., & Wing, J. M. Measuring relative attack surfaces (pp. 109-137). Springer US. Aug. 2003.
Manadhata, P., & Wing, J. M. An attack surface metric (No. CMU-CS-05-155). Carnegie-Mellon Univ Pittsburgh PA School of Computer Science. Nov. 2008.
Newsham, Tim, and Jim Hoagland. "Windows Vista network attack surface analysis: A broad overview." Symantec Response whitepaper, Jul. 2006.
Wang, Lingyu, et al. "An attack graph-based probabilistic security metric." Data and applications security XXII. Springer Berlin Heidelberg,Jul. 2008. 283-296.

(Continued)

Primary Examiner — Jason Lee
(74) Attorney, Agent, or Firm — Maschoff Brennan

(57) ABSTRACT

A method of determining an attack surface of software may include generating a platform for testing at least one deployment of software code, identifying protocols that are used by the at least one deployment, mapping the protocols to at least one port in the at least one deployment, and computing a metric comprising parameters for the at least one deployment.

16 Claims, 9 Drawing Sheets

(56) References Cited

OTHER PUBLICATIONS

Howard, Michael. "Attack surface: Mitigate security risks by minimizing the code you expose to untrusted users." MSDN Magazine, http://msdn. microsoft. com/en-us/magazine/cc163882. Nov. 2004.

Gruschka, Nils, and Meiko Jensen. "Attack surfaces: A taxonomy for attacks on cloud services." Cloud Computing (Cloud), 2010 IEEE 3rd International Conference on. IEEE, Jul. 2010.

Extended European Search Report for corresponding Application No. EP 15 17 2071, mailed Mar. 23, 2016.

\* cited by examiner

DETERMINING AN ATTACK SURFACE OF SOFTWARE

FIELD

The embodiments discussed herein are related to determining an attack surface of software.

BACKGROUND

A software application may include hundreds or thousands of files, and hundreds of thousands or millions of lines of code. The code of the software application may include parts that may access sensitive data from databases or data stored on an associated electronic device. Additionally, the software application may include code that accesses communication networks, such as the Internet, and transmits and receives data over those networks. In general, the security of a software application depends on how it interacts with its environment of users, communication networks, and storage.

Some software applications may be deployed in many different ways in which different parameters and customizations may be available. Determining which deployment of a software application is more secure and less vulnerable to attack as compared to another deployment may be difficult.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of determining an attack surface of software may include generating a platform for testing at least one deployment of software code. Protocols that are used by the at least one deployment may be identified. The protocols may be mapped to at least one port in the at least one deployment. A metric may be computed comprising parameter for at least one deployment.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein relate to determining an attack surface of software for at least one deployment of software code. For example, the software code may be cloud computing software. A platform may be generated for testing the at least one deployment. For example, the platform may be a testbed. Protocols that are used by the at least one deployment may be identified. The software includes ports that serve as communication endpoints. The protocols may be mapped to at least one port in the at least one deployment. In some embodiments, static analysis may be performed on the at least one deployment. Static analysis may include identifying paths that access sensitive information.

A metric may be computed comprising parameters for the at least one deployment. The parameters may include a number of unused ports, a number of open ports, information about at least one protocol used, a volume of traffic transmitted to external internet protocol addresses (IP), a number of choke points, a link traffic volume, a mapping of protocols to nodes, and a percentage of sensitive paths. In some embodiments, information about the at least one protocol may be used to calculate a danger score for each protocol that reflects whether any of the protocols have a security hole and how long the protocol has existed, and a total danger score that may be a sum of the danger score for all protocols used by each of the first and second deployments. The volume of traffic transmitted to external IP addresses may be used to determine whether anyone is committing malfeasance, for example, by snooping on the software. The choke point may be a single point of failure, such as any node whose removal may cause the software to fail or have a significant decrease in performance. The link traffic volume may be used to determine how much traffic is being communicated across certain links. For example, high volume may be an indicator of a snooper. The link traffic volume may be calculated as at least one of an aggregate amount of link traffic, an average and maximum for each link, a sum of all the volumes of link traffic, and a sum of a ratio of all volumes. In some embodiments, multiple deployments may be compared. For example, a base line deployment may be compared to a first deployment or a first deployment may be compared to a second deployment. A visualization of the deployments may be generated based on a number of metrics available.

Embodiments of the present invention will be explained with reference to the accompanying drawings.

Figure 1A:
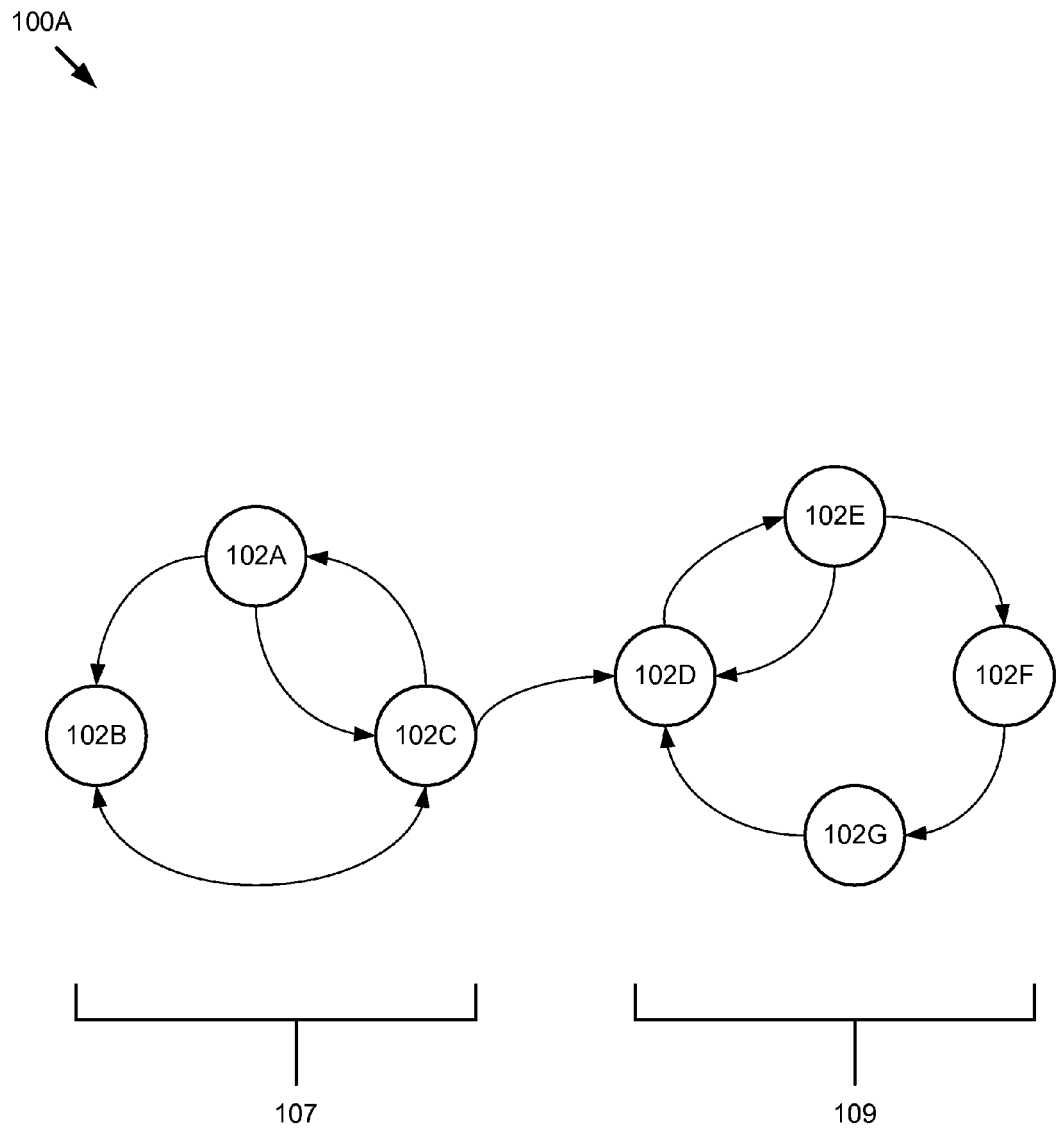
FIG. 1A illustrates an example flow graph for software code that is being tested.

FIG. 1A illustrates an example flow graph 100A for software code that may be tested for determining one or more metrics associated with vulnerabilities, arranged in accordance with at least some embodiments described herein. The flow graph 100A may be configured to represent different deployments of the software code. In general, in some embodiments, a flow graph, like the flow graph 100A, may be part of a process in determining a metric of the software code as described herein. The flow graph 100A is an example flow graph that is simplistic and provided for explanatory and illustrative purposes. Modifications, additions, or omissions may be made to the flow graph 100A without departing from the scope of the present disclosure.

In some embodiments, the software code may be generated using one of the following programming languages Perl, C, C++, C#, Java, JavaScript, Python, Ruby, assembly language, Fortran, common business-oriented language (COBOL), structured query language (SQL), hypertext preprocessor (PHP), extensible markup language (XML), hypertext markup language (HMTL), among others.

The flow graph 100A may include ports 102A, 102B, 102C, 102D, 102E, 102F, and 102G (collectively referred to herein as "the ports 102") that are connected together by edges that are depicted as lines with arrows in FIG. 1A. The nodes 102 in the flow graph 100A may each correspond to a different operation within the software code, such as a function or method; other operations, such as, while statements, if statements, let statements, case statements, among other types of code statements; operators such as, =, +, *, -, &, %; among other operations. In some embodiments, the nodes 102 may include ports in the software. Ports may serve as communication endpoints in a computer's host operating system. For example, when the software is cloud computing software, the ports may be endpoints for communicating with the network used for the cloud computing. The ports may be open or closed. Open ports are accessible for communications with entities outside of the software; closed ports are not accessible. The ports may be associated with protocols.

In some embodiments, the software code is analyzed to determine choke points in the network. For example, in FIG. 1A, node 102C is a choke point because removing the node 102C may break communications between a first set of nodes 107 of the software code and a second set of nodes 109 of the software code. The metric application discussed in greater detail below may be configured to determine metrics associated with the software code. For example, the metric application may determine a deployment of the software code and metrics including a number of unused ports, a number of open ports, a number of protocols used, a volume of traffic transmitted to external IP addresses, a number of choke points, a link traffic volume, a mapping of protocols to nodes, and a percentage of sensitive paths.

Figure 1B:
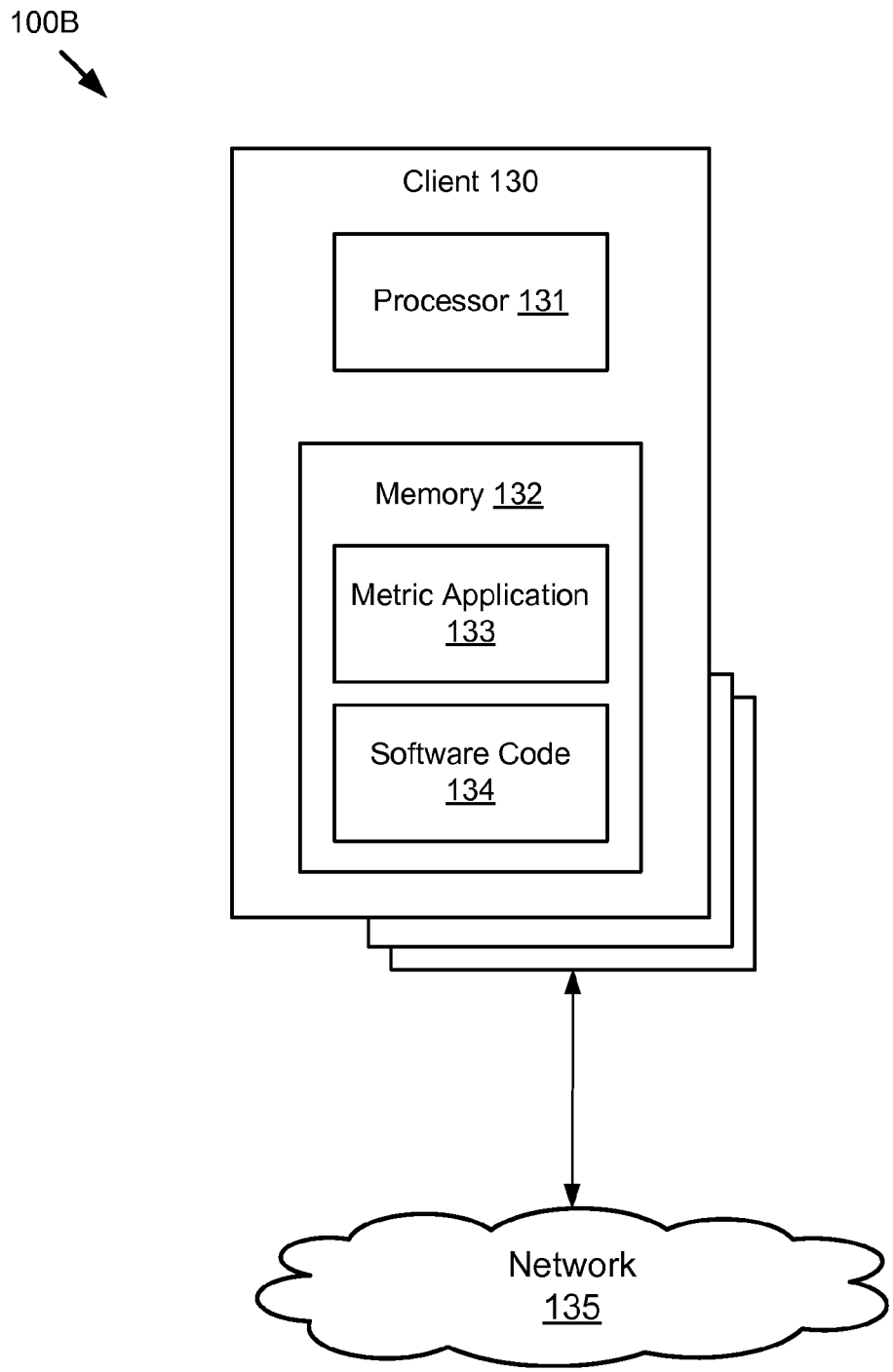
FIG. 1B is a block diagram of an example computer system.

FIG. 1B illustrates a block diagram of a computer system 100B ("system 100B") arranged in accordance with at least some embodiments described herein. The system 100B includes a client 130 coupled to a network 135. The client 130 may include a processor 131 and memory 132. The memory 132 may include a metric application 133 and software code 134. The metric application 133 may be configured to analyze at least one deployment of the software code 134. The network 135 may be wired or wireless, include a local area network (LAN), a wide area network (WAN), and/or any other data path across which multiple devices may communicate.

The processor 131 may include any suitable special-purpose or general-purpose computer, computing entity, or processing device including various computer hardware or software modules and may be configured to execute instructions stored on any applicable computer-readable media. For example, the processor 131 may include a general purpose controller, a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1B, it is understood that the processor 131 may include any number of processors configured to perform any number of operations.

The memory 132 may store instructions and/or data that may be executed by the processor 131. The instructions and/or data may include code that performs the techniques described herein. In some embodiments, the instructions may include instructions and data that cause the processor 131 to perform a certain function or a group of functions. In some embodiments, the memory 132 may include computer-readable media for carrying or having computer-executable instructions or data structures stored thereon. Such computer-readable media may be any available media that may be accessed by a processor 131 that is programmed to execute the computer-executable instructions stored on the computer-readable media. By way of example, and not limitation, such computer-readable media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

The memory may store instructions for executing a metric application 133 and the software code 134. In some embodiments, the software code 134 may be stored on a different client 130 from the metric application 133. For example, when the software code 134 is a cloud computing application, the software code 134 may be stored as a distributed system with components on different clients 130 that communicate with each other via the network 135. Additionally, in some embodiments, a library of the configurations for the software code 134 may be stored on the same client 130 as the metric application 133 and software code 134, or on a separate client 130. The metric application 133 may analyze two or more different deployments of the software code 134 and may determine metrics associated with each deployment.

As used herein, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on the system 100B.

Figure 2:
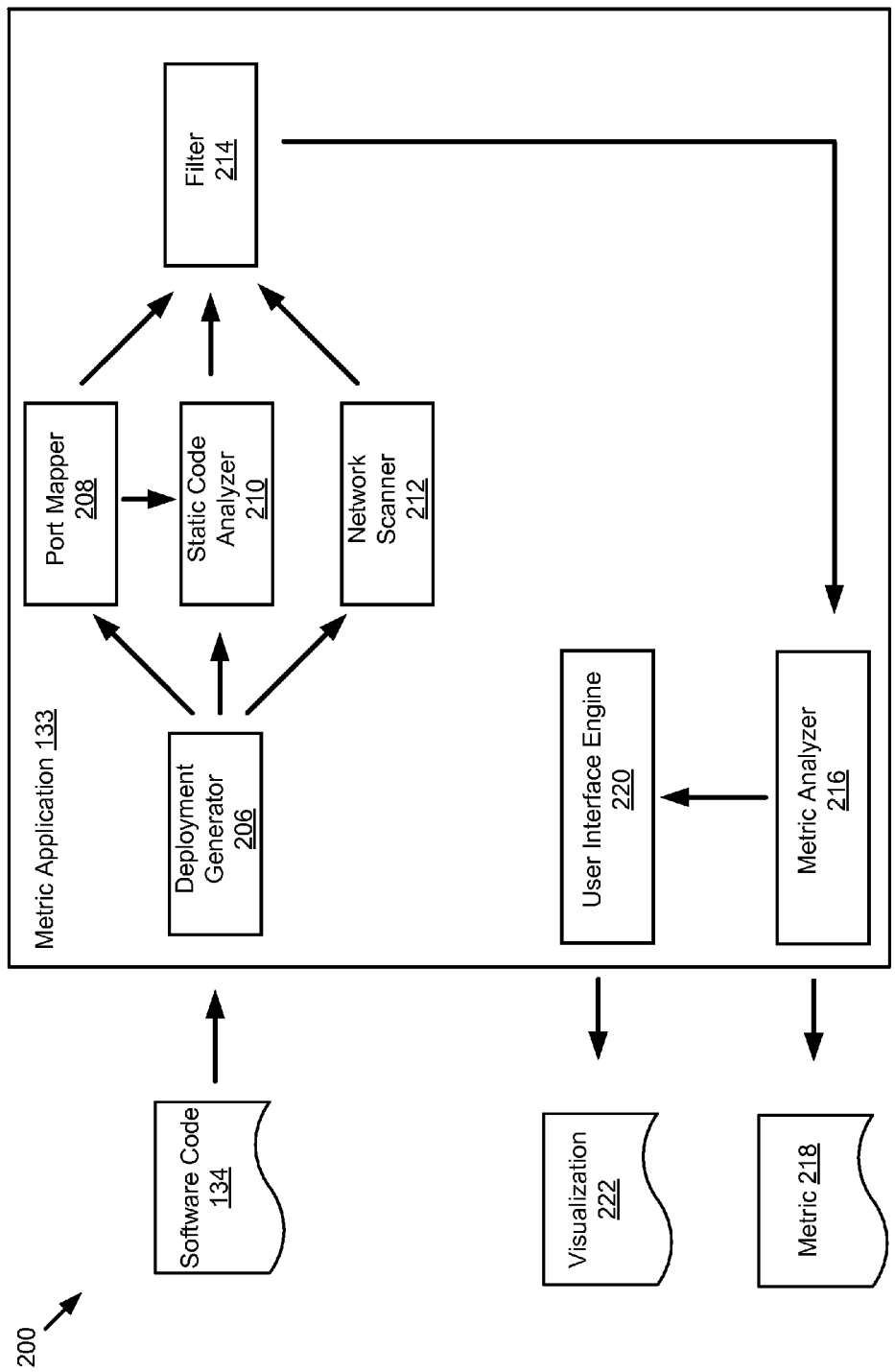
FIG. 2 is a block diagram of an example system for determining a metric of software code.

FIG. 2 is block diagram of an example system 200 for determining an attack surface of software based on metrics, arranged in accordance with at least some embodiments described herein. In particular, the system 200 may be configured to generate a platform for testing at least one deployment of the software code 134 of FIG. 1B and compute metrics for the deployment. In some embodiments, the metric application 133 may be configured to generate a first deployment with a first set of metrics that are compared to a second deployment with a second set of metrics. The metric application 133 may include a deployment generator 206, a port mapper 208, a static code analyzer 210, a network scanner 212, a filter 214, a metric analyzer 216, and a user interface engine 220.

The deployment generator 206 may be configured to receive software code 134. The software code 134 may be generated using one of the following programming languages Perl, C, C++, C#, Java, JavaScript, Python, Ruby, assembly language, Fortran, COBOL, SQL, PHP, XML, HTML, among others. The software code 134 may be received from a database, from a network, such as the network 135 of FIG. 1B, from a tangible computer-readable storage media, or from some other location.

The deployment generator 206 may be configured to generate at least one deployment of the software code 134. The deployment generator 206 may be configured to generate the deployment from different scripts, configuration files, and customizations that are available for the software code 134. For example, the software code 134 may be cloud computing software and the cloud orchestration of cloud computing software may be deployed on a cloud computing network in a variety of ways. In some embodiments, the deployment generator 206 accesses a library of configurations to generate the deployment. The deployment generator 206 may generate a platform for testing the deployment of the software code 134. For example, the deployment generator 206 may create a testbed, which measures and deploys techniques for generating at least one deployment of the software code 134.

In some embodiments, the deployment generator 206 may be configured to generate multiple deployments of the software code 134. For example, the deployment generator 206 may be configured to generate a platform for testing a first deployment of the software code 134 and, once the metric is generated for the first deployment, the deployment generator 206 may be configured to generate a platform for testing a second deployment of the software code 134. In another example, the deployment generator 206 may be configured to generate a baseline deployment and a first deployment for comparison.

The port mapper 208 may be configured to receive the at least one deployment from the deployment generator 206. The port mapper 208 may be configured to retrieve protocols associated with the at least one deployment from a database, identify protocols that are used by the at least one deployment with protocols, and map the protocols to at least one port in the at least one deployment. Based on the mapping, the port mapper 208 may be configured to know which processes are running on each node. The port mapper 208 may be configured to generate a list of open ports and identify the instances where there is a unique mapping between protocols and nodes. In some embodiments, the port mapper 208 may be configured to retrieve from a database known protocols and their versions to determine their vulnerability level. For example, some version of the protocol may be deemed to have dangerous vulnerabilities.

The static code analyzer 210 may be configured to receive the at least one deployment. The static code analyzer 210 may be configured to perform static analysis on the at least one deployment using application programming interfaces (APIs). For example, the static code analyzer 210 may determine specific modules in the software code 134, if the source code is available, that open ports and deploy protocols. For those modules, the static code analyzer 210 measures paths that access sensitive information to give a more detailed measurement. In some embodiments, the static code analyzer 210 may be configured to measure paths in the deployments of the software code 134 that access sensitive information.

In some embodiments, the static code analyzer 210 may be configured to create actions using API lists. For example, once the testbed is running, the static code analyzer 210 may be configured to use an API to create actions for creating multiple users, computing tasks and jobs to be run, administration for setting up a database and populating the database with 1,000 entries, managing identities, managing access privileges, initially populating a database, creating accounts, setting up computer jobs, etc. Additional information about this process may be found in U.S. patent application Ser. No. 13/862,234, entitled "DETERMINING SOFTWARE METRICS" and filed on Apr. 12, 2014, the entire contents of which are herein incorporated by reference.

The network scanner 212 may be configured to receive the at least one deployment from the deployment generator 206. The network scanner 212 may generate a list of unused ports, external IP connections, traffic to the external IP connections, choke points, and link traffic volume.

The network scanner 212 may be configured to determine a volume of traffic to external IP addresses. For example, when the software code 134 is cloud computing software, the nodes may represent different virtual machines. The virtual machines may be on the same physical computer or server 130 and may behave as separate computers on the network 135 or they may be on separate physical computers or servers 130. The network scanner 212 may be configured to measure what kind of traffic is going outside of the private cloud by determining whether the node is communicating with an IP address that is external to the private cloud. For example, devices within the same local network may use a 32-bit (4-byte) IP address that may have the same numbers for the two most significant bytes and different numbers for the two least significant bytes. If the two most significant bytes of the IP address for the node are different from the entity the node is communicating with, the node is communicating with an external IP address.

The network scanner 212 may be configured to determine the choke points based on the centrality of some nodes that lie on most paths in the deployment of the software code 134. In some embodiments, the network scanner 212 may determine the choke points using standard graph algorithms.

The network scanner 212 may be configured to determine the link traffic volume by determining how much traffic is being communicated across certain links. In some embodiments, the network scanner 212 may be configured to use one or more APIs to determine the link traffic volume. The link traffic volume may include an amount of link traffic, an average and a maximum for each link, a sum of all volumes, and/or a sum of the ratio of all volumes.

The filter 214 may be configured to receive the network traffic from the network scanner 212. The filter 214 may also be configured to receive data from the port mapper 208 and/or the static code analyzer 210. The filter 214 may be configured to parse and filter the data and transmit the remaining data to the metric analyzer 216. For example, the filter 214 may receive dumps and log files, parse the files, and filter out irrelevant data for the metric analyzer 216.

The metric analyzer 216 may be configured to combine the remaining data from the filter 214 and compute a metric 218 for the at least one deployment. The metric 218 may be a reflection of the attack surface vulnerability of the different deployments. For example, the metric analyzer 216 may determine that the deployment has a choke point and several nodes that receive a high volume of traffic, which suggests that the deployment could experience a failure and that entities may be snooping on the software. The metric analyzer 216 may be configured to generate a report on differences between different deployments of the software code 134.

In some embodiments, the metric analyzer 216 computes a metric 218 comprising parameters for the at least one deployment, the parameters including a number of unused ports, a number of open ports, a number of protocols used, a volume of traffic transmitted to external IP addresses, a number of choke points, a link traffic volume, a mapping of protocols to nodes, and a percentage of sensitive paths.

The unused ports may be ports that are not used for communication during execution of the deployment of the software code 134. A higher number of unused ports may indicate a higher degree of vulnerability because the unused ports represent potential security holes where unauthorized entities may obtain access to the network and intercept the network traffic.

The open ports are ports that are available for communication. Open ports are ports that are listening for communications, which exposes the ports to communication with unauthorized entities. As a result, an increase in the number of open ports may also indicate increased vulnerability.

For the number of protocols, the metric analyzer 216 may determine the number of protocols used at each node. The metric analyzer 216 may be configured to assign a danger score to each protocol based on the version of each protocol being used at each node, how long the protocol has been used (where a longer time period is associated with a safer protocol because there has been more opportunity to test the protocol), and whether the protocols are associated with known security holes. In some embodiments, the metric analyzer 216 may be configured to determine a total danger score for each deployment that is a sum of the danger score for each protocol used with the first and second deployments of the software code 134.

The volume of traffic transmitted to external IP addresses may be used to determine whether an unauthorized entity is snooping on the software code 134. For example, if a node is transmitting a high volume of traffic to an external IP address, the node may be transmitting private data to the unauthorized entity. As a result, a lower volume of traffic to external IP addresses indicates a more secure deployment of the software code 134.

The choke points in the deployment are potential points of vulnerability because the failure of a node that is a choke point may cause the software code 134 to have a diminished functionality or stop working. As a result, a lower number of choke points is associated with a more secure deployment of the software code 134.

Similar to the volume of traffic being communicated to external IP addresses, a high volume of link traffic may be indicative of an unauthorized entity snooping on the software code 134. As a result, a lower volume of link traffic is associated with a less vulnerable deployment of the software code 134.

The metric analyzer 216 may be configured to use the mapping of protocols to nodes determined by the port mapper 208 to identify a number of unique cases where there is a unique mapping. If a protocol is running on only one node, taking down the node would stop the protocol from running, which makes the software code more vulnerable to failure. For example, if only one node is running a web server that gives a user access to a dashboard, node failure would cause the client side of the software code 134 to fail and frustrate the user. As a result, redundant protocols indicate less vulnerability and a lower number of cases where there is a unique mapping of protocols to nodes may be associated with a more secure deployment of the software code 134.

Further, in some embodiments, the metric analyzer 212 may be configured to generate a percentage of sensitive paths based on the paths that access sensitive information determined by the static code analyzer 210.

In some embodiments, the metric analyzer 212 may be configured to present the metric 218 (also known as an attack surface metric) as a list of the parameters for the at least one deployment. In some embodiments, the metric analyzer 212 may be configured to present the metric 218 as a single value instead of multiple parameters. For example, the metric 218 may be a normalized sum of all the parameters.

In some embodiments, the metric analyzer 212 may be configured to present a comparison of the metric 218 for multiple deployments. The multiple deployments may include a baseline deployment and another deployment, a first deployment and a second deployment, etc. The presentation may include an element-wise comparison of the two (or more) deployments. In some embodiments, the metric analyzer 212 may be configured to generate the total metric 218 for the multiple deployments as a comparison. For example, the metric analyzer 212 may determine that the first deployment is 25% less vulnerable than the second deployment.

In these or other embodiments, the metric analyzer 212 may be configured to normalize the metric 218 according to a baseline to give a difference between the metric 218 and the baseline. For example, the metric analyzer 212 may determine that the first deployment has an attack surface metric of 10% lower than the baseline, and that the second deployment has an attack surface metric of 15% higher than the baseline.

In yet another embodiment, the metric analyzer 212 may be configured to generate a metric 218 for a subset of the parameters and may include individual details for the remaining parameters. For example, in some embodiments, the number of unused ports and the number of open ports may be displayed separately because of, in some instances, importance and the remaining parameters are combined into the metric 218. In yet another embodiment, the metric analyzer 212 may be configured to apply a weight to some of the parameters based on their importance. For example, the metric analyzer 212 may apply weights to the number of unused ports and the number of open ports by using a dot product of a weight vector. The metric analyzer 212 may then generate a metric 218 as a sum of the individual parameters.

The user interface engine 220 may be configured to receive the metric 218 from the metric analyzer 216 and generate visualizations 220 of the parameters. For example, the user interface engine 220 may be configured to generate a network view as illustrated in FIG. 3A, a process view as illustrated in FIG. 3B, an overall view as illustrated in FIG.

Figure 4:
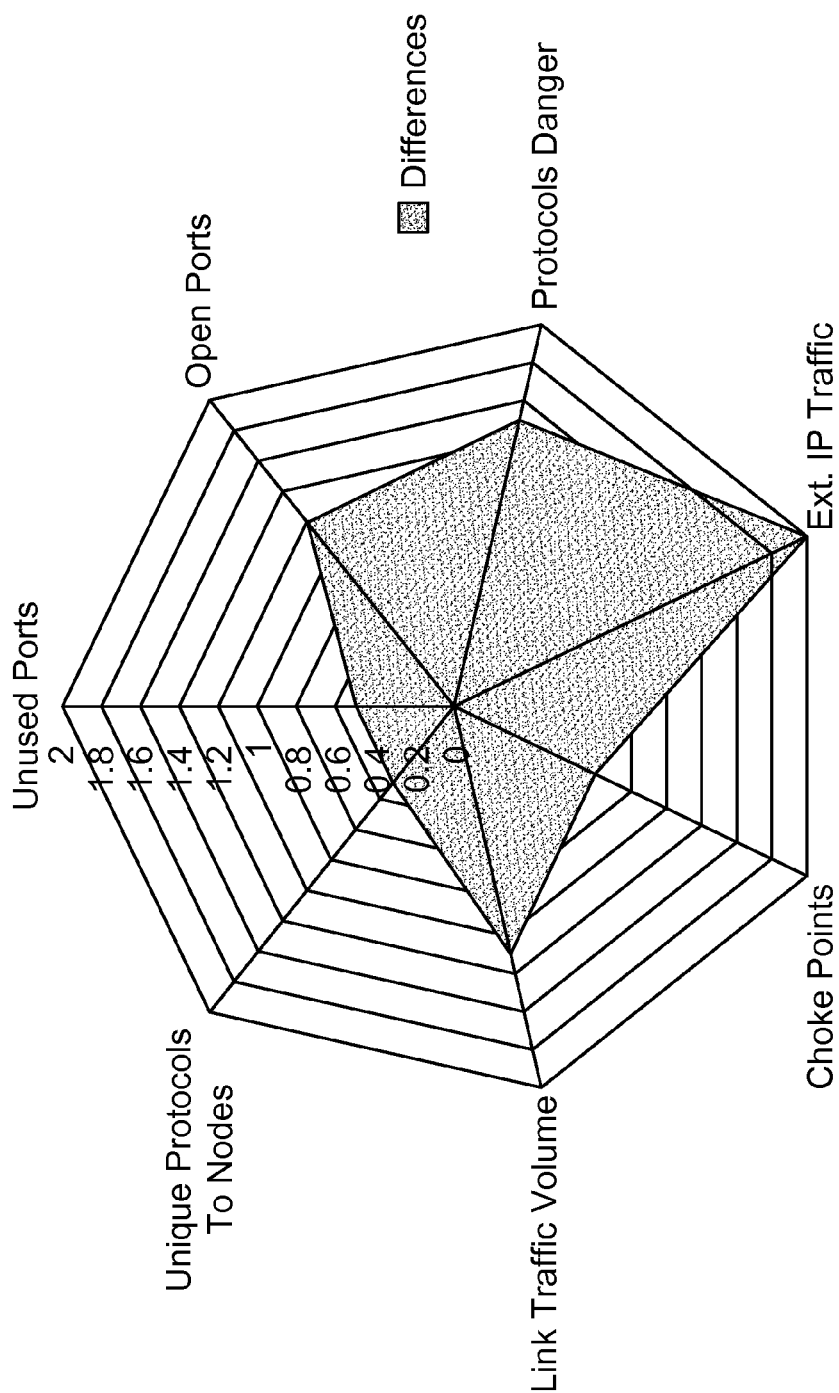
FIG. 4 illustrates an example visualization comparing a first deployment of software code to a second deployment of software code.

3C, or a different report that illustrates differences in the parameters using radar as illustrated in FIG. 4. The figures will be discussed in greater detail below.

Modifications, additions, or omissions may be made to the system 200 without departing from the scope of the present disclosure. For example, the user interface engine 220 may be optional. In some embodiments, certain aspects of the system 200 may be different depending on the programming language for the software code 134. For example, a filter 214 used for parsing Java may be different than a filter 214 used for parsing C. However, the fundamental principles described with respect to the system 200 remain the same regardless of the programming language used for the software code 134. In some embodiments, the system 200 may be implemented using computer-readable media for carrying or having computer-executable instructions or data structures stored thereon that implement the system 200.

Figure 3A:
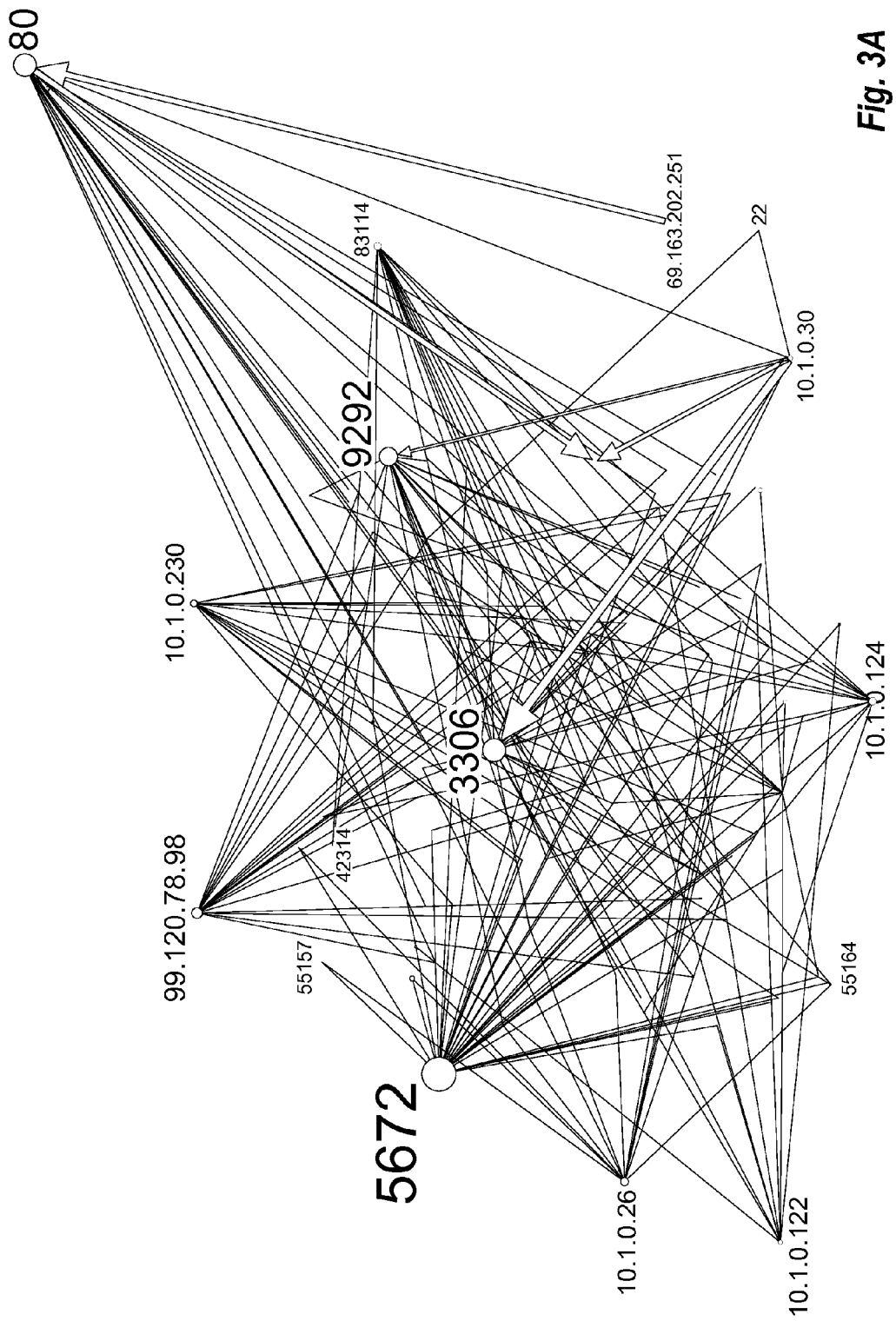
FIG. 3A illustrates an example visualization of metrics of software code that includes a network view.
Figure 3B:
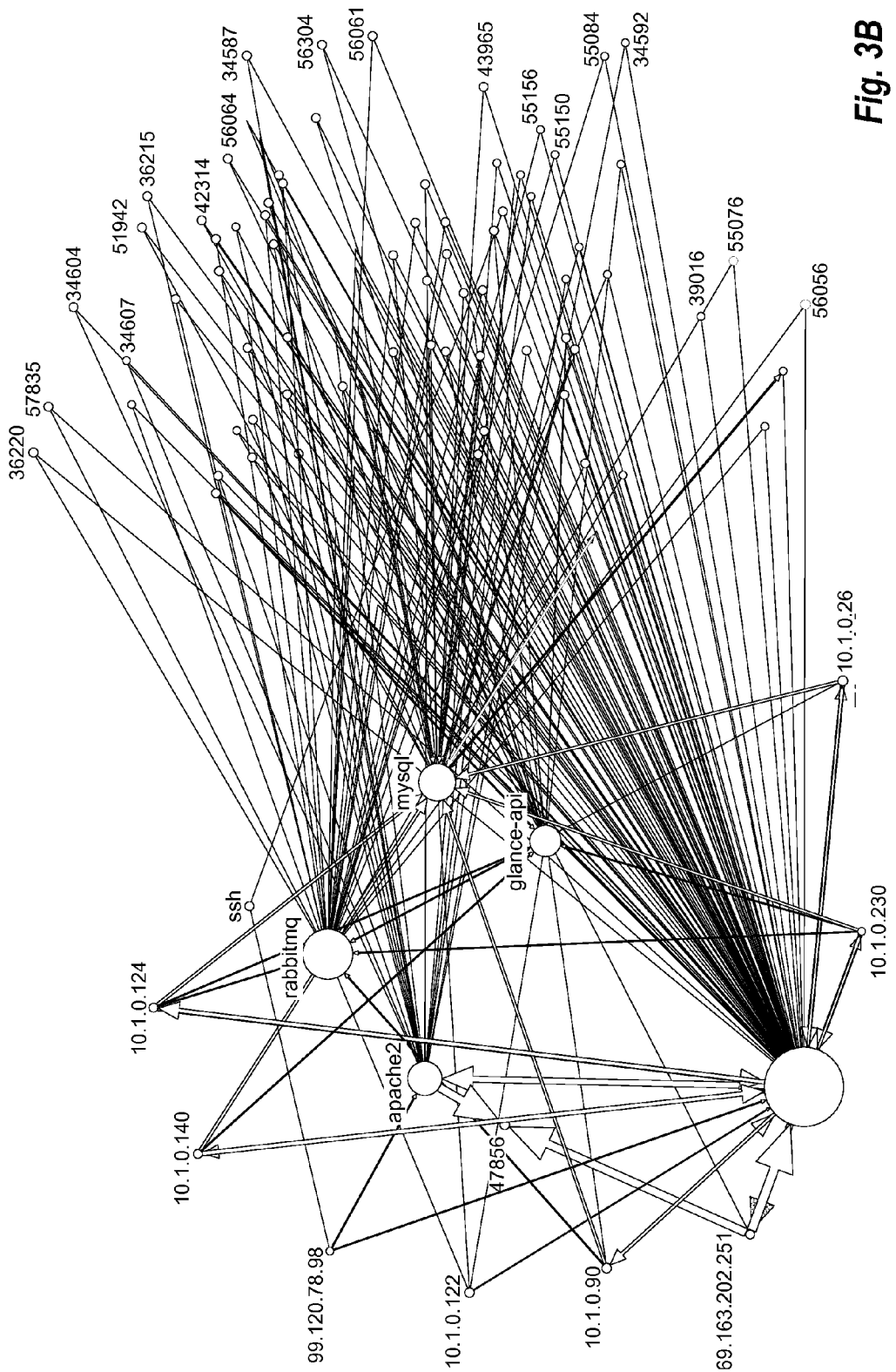
FIG. 3B illustrates an example visualization of metrics of software code that includes a process view.

FIG. 3A illustrates an example network view that indicates one or more parameters included in the metric generated by the user interface engine 220. The network view includes nodes as illustrated with IP addresses and ports that represent the API interaction between nodes generated for the software code 134. The network view may illustrate which nodes are critical because they are associated with multiple links (edges). The network view may also include the unused nodes, which may be identified based on not having any links connecting them to other nodes. The network view represents heavily used links with thicker edges.

FIG. 3B illustrates an example process view that indicates one or more parameters included in the metrics. The process view uses process information to enhance the network view. Specifically, the process view adds APIs used by the different nodes to the graph and includes circles around the nodes and APIs to indicate which nodes and APIs are most connected to the ports in the network.

Figure 3C:
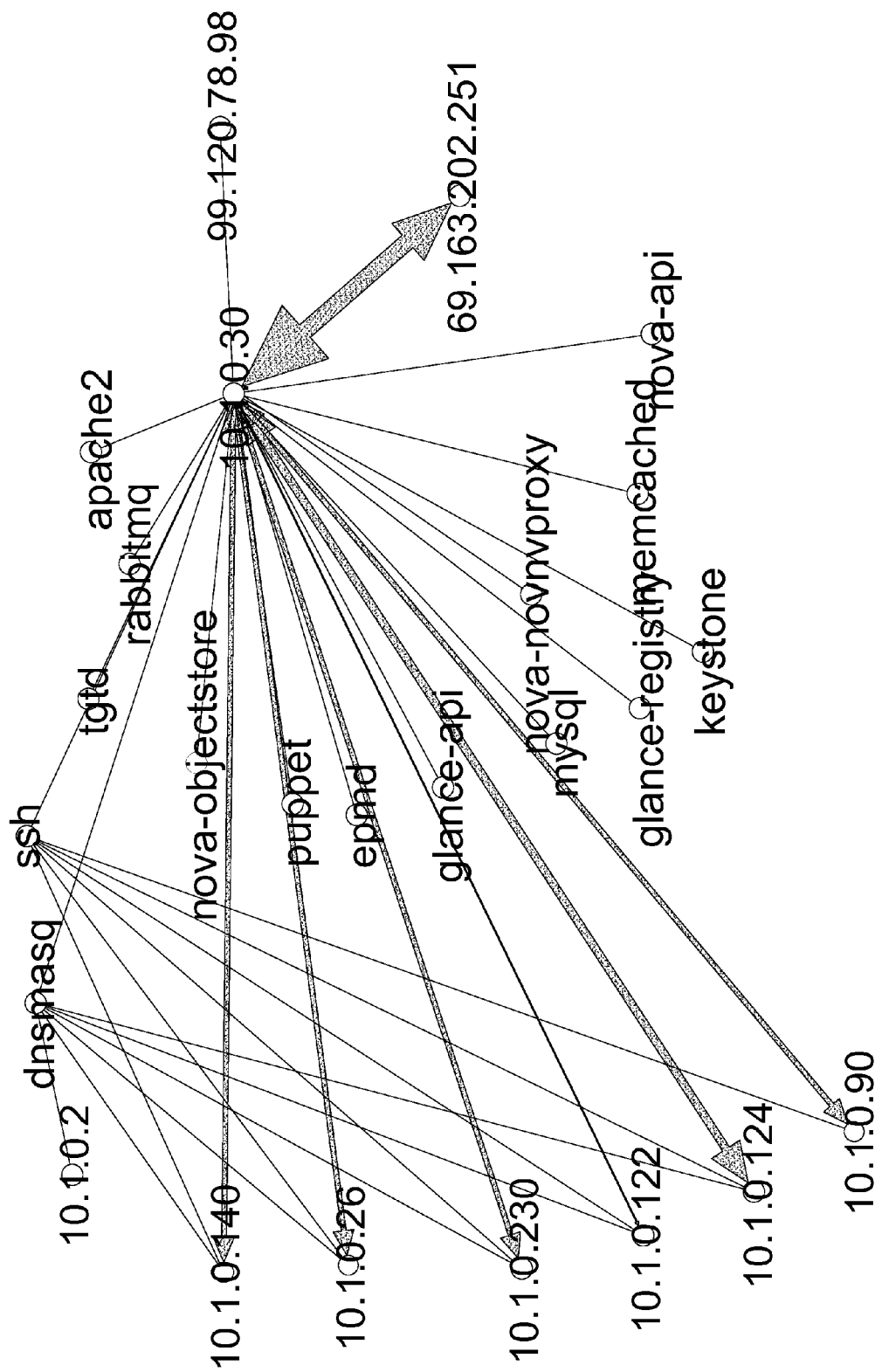
FIG. 3C illustrates an example visualization of metrics of software code that includes an overall view.

FIG. 3C illustrates an example overall view that indicates one or more parameters included in the metrics. The overall view may be a comprehensive view for parameters of the attack surface that shows connections between the nodes and different APIs. The thickness of the links between the nodes may be indicative of the amount of link traffic between the nodes.

FIG. 4 illustrates an example visualization comparing a first deployment to a second deployment in a radar map. The radar map illustrates the attack surface metrics by showing the difference between the two deployments normalized by a baseline. For example, in FIG. 4 one of the deployments has two times more external IP traffic than the other deployment, 1.5 times more protocol danger than the other deployment, 1.2 more open ports, 0.3 more unused ports, 0.3 more unique protocols to nodes, 1.3 more link traffic volume, and 0.8 more choke points. If one of the deployments was not consistently greater than the other, a better visualization could be an overlay of the metrics associated with the two different deployments, a line chart, etc.

Figure 5:
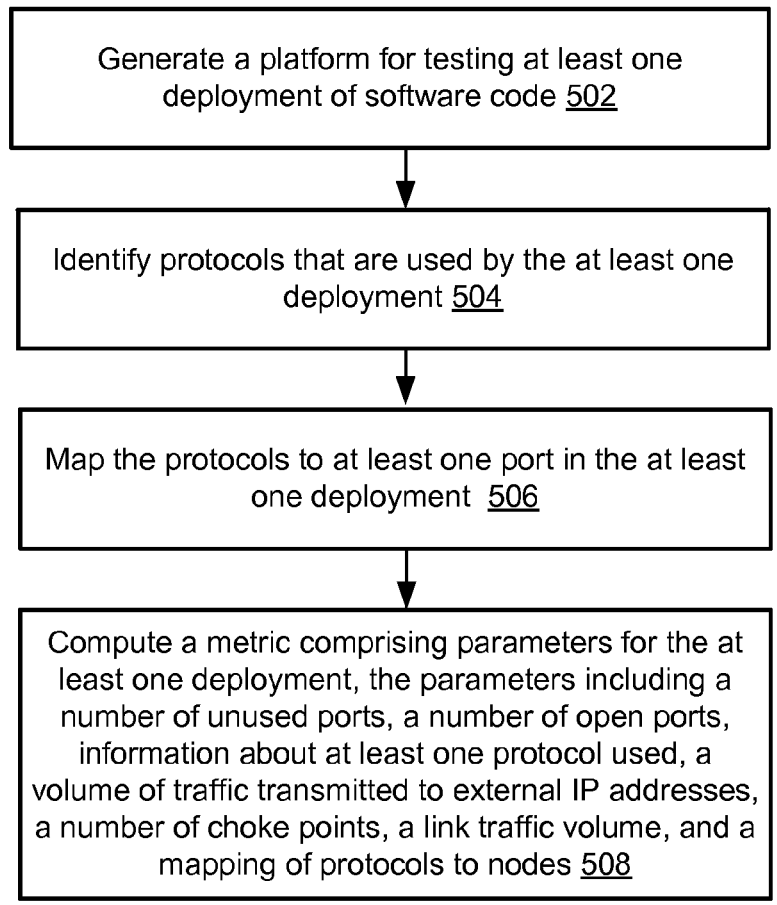
FIG. 5 illustrates an example method for determining an attack surface of software.

FIG. 5 is a flow chart of an example method 500 of determining an attack surface of software, arranged in accordance with at least some embodiments described herein. The method 500 may be implemented, in some embodiments, by a system, such as the system 200 of FIG. 2. In particular, the method 500 may be implemented by the metric application 133 of FIG. 2. For example, the method 500 may be implemented by the deployment generator 206, the port mapper 208, the static code analyzer 210, the network scanner 212, the filter 214, and the metric analyzer 216 of FIG. 2. Although illustrated as discrete blocks, various blocks may be divided into additional blocks, combined into fewer blocks, or eliminated, depending on the desired implementation.

The method 500 may begin at block 502, where a platform may be generated for testing at least one deployment of software code 134. For example, the platform could be a testbed.

In block 504, protocols that are used by the at least one deployment may be identified. For example, the protocols used by the deployment are identified from a database and information associated with the protocols, such as the version, any known security holes in the protocols, and the length of time that they have been in use are retrieved.

In block 506, the protocols may be mapped to at least one port in the at least one deployment. The mapping may be used to identify which ports are open.

In block 508, the metric comprising parameters for the at least one deployment may be computed, the parameters including a number of unused ports, a number of open ports, information about at least one protocol used, a volume of traffic transmitted to external IP addresses, a number of choke points, a link traffic volume, and a mapping of protocols to nodes.

Figure 6:
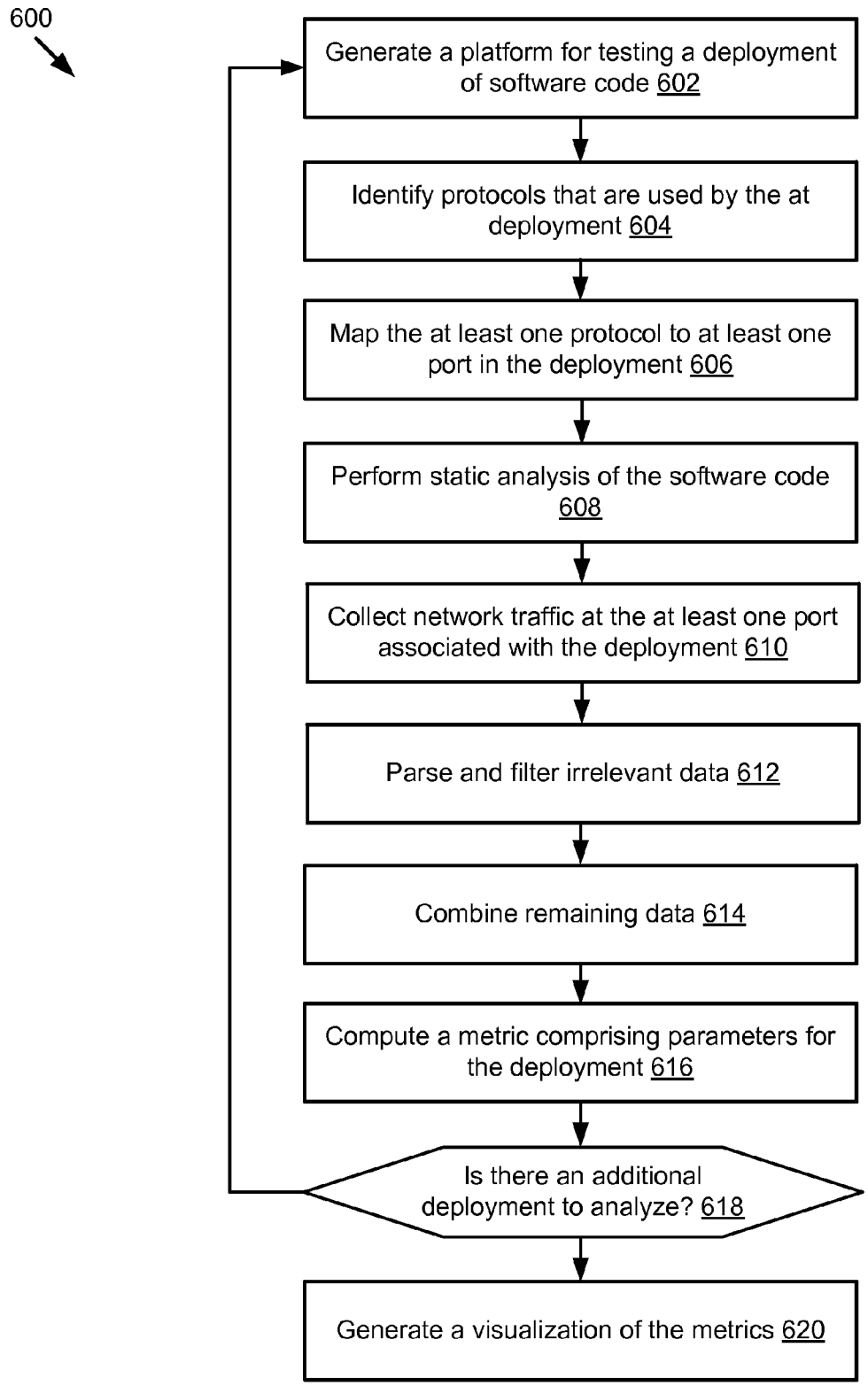
FIG. 6 illustrates another example method for determining an attack surface of software.

FIG. 6 is a flow chart of another example method 600 of determining an attack surface of software, arranged in accordance with at least some embodiments described herein. The method 600 may be implemented, in some embodiments, by a system, such as the system 200 of FIG. 2. In particular, the method 600 may be implemented by the metric application 133 of FIG. 2. For example, the method 600 may be implemented by the deployment generator 206, the port mapper 208, the static code analyzer 210, the network scanner 212, the filter 214, the metric analyzer 216, and the user interface engine 220 of FIG. 2. Although illustrated as discrete blocks, various blocks may be divided into additional blocks, combined into fewer blocks, or eliminated, depending on the desired implementation.

The method 600 may begin at block 602, where a platform may be generated for testing a deployment of software code 134. In block 604, protocols that are used by the at least one deployment may be identified. In block 606, the protocols may be mapped to at least one port in the deployment. In block 608, static analysis of the software code 134 may be performed, for example, using application programming interfaces (APIs).

In block 610, network traffic at the at least one port associated with the deployment may be collected. For example, ports with unusually high traffic may be accessed by unauthorized entities that are snooping on the software code 134.

In block 612, irrelevant data may be parsed and filtered. For example, the dumps and log files are parsed and filtered to prepare the data for computing metrics. In block 614, the remaining data may be combined.

In block 616, a metric may be computed comprising parameters for the deployment. Parameters may include a number of unused ports, a number of open ports, information about the one or more protocols used, a volume of traffic transmitted to external IP addresses, a number of choke points, a link traffic volume, a mapping of protocols to nodes, and a percentage of sensitive paths. In some embodiments, the parameters may be combined to create a first attack surface metric for the first deployment and a second attack surface metric for the second deployment. The attack surface metric may be a summation of the individual parameters or a summation of a dot product of a weight and a value for each parameter.

In block 618, it may be determined whether there is an additional deployment to analyze. For example, the deployment could be a baseline deployment and a first deployment could be available for comparison. In another example, the deployment could be a first deployment and a second deployment could be available. If there is an additional deployment to analyze, the method may repeat starting at block 602. If there is not an additional deployment to analyze, the method may proceed to block 620. In block 620, a visualization of the metrics may be generated. For example, a graph may include an overlay of the parameters for the first deployment on top of the second deployment, a line graph comparing the parameters, a graph with the attack surface metric, etc.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Furthermore, the method 300 is only one example of a method that may be used to determine path counts within a contracted flow chart. Other methods for determining path counts may be used without departing from the scope of the present disclosure.

The foregoing detailed description has set forth various embodiments via the use of block diagrams, flowcharts, and/or examples, such as the block diagram that illustrates the system 200 of FIG. 2 and the flow charts that illustrate the methods 500, 600 of FIGS. 5 and 6, respectively. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to carry out the distribution Furthermore, the embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data, which cause a general-purpose computer, special purpose computer, or special purpose-processing device (e.g. a processor) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of determining an attack surface of software, the method comprising:

generating, with one or more hardware processors, a platform for testing at least one deployment of software code;

identifying, with the one or more hardware processors, protocols that are used by the at least one deployment;

mapping, with the one or more hardware processors, the protocols to at least one port in the at least one deployment;

performing, with the one or more hardware processors, a static analysis of the at least one deployment to determine modules of the software code in the at least one deployment that open ports and deploy the protocols;

determining, with the one or more hardware processors, a plurality of parameters that correspond to the at least one deployment based on the static analysis and based on the mapping of the protocols, wherein the plurality of parameters indicate an attack surface vulnerability of the at least one deployment and include a number of unused ports in the at least one deployment, a number of open ports in the at least one deployment, information about at least one protocol used by the at least one deployment, a volume of traffic transmitted to external internet protocol addresses (IP) with respect to the at least one deployment, a number of choke points in the at least one deployment, a link traffic volume associated with the at least one deployment, and a mapping of protocols to nodes in the at least one deployment;

computing, with the one or more hardware processors, a metric for the at least one deployment based on the plurality of parameters, wherein the metric represents the attack surface vulnerability of the at least one deployment and wherein the at least one deployment includes a baseline deployment; and normalizing, with the one or more hardware processors, the metric based on the baseline deployment.

2. The method of claim 1, wherein the information about the at least one protocol used includes a first danger score for a first protocol that reflects whether the first protocol has a security hole and how long the first protocol has existed, a second danger score for a second protocol that reflects whether the second protocol has a security hole and how long the second protocol has existed, and a total danger score that includes a sum of the first danger score and the second danger score.

3. The method of claim 1, wherein the at least one deployment includes a first deployment and a second deployment and wherein computing the metric comprises computing a first metric for the first deployment and computing a second metric for the second deployment.

4. The method of claim 1, wherein:
the at least one deployment includes a first deployment that is the baseline deployment;
the at least one deployment includes a second deployment;
computing the metric for the at least one deployment includes computing a first metric for the first deployment and computing a second metric for the second deployment; and
the method further comprises normalizing the second metric based on the first metric.

5. The method of claim 1, further comprising:
collecting information related to network traffic at the at least one port in the at least one deployment; and
determining the plurality of parameters based on the information related to the network traffic.

6. The method of claim 1, further comprising determining how much traffic is being communicated across certain links and wherein the link traffic volume is determined based on determining how much traffic is being communicated across the certain links and includes one or more of the following: an aggregate amount of link traffic, an average and maximum for each link, a first sum of all link traffic volumes, and a second sum of a ratio of all volumes.

7. The method of claim 1, further comprising parsing and filtering irrelevant data.

8. The method of claim 1, further comprising generating a visualization of the metric based on a number of metrics available.

9. The method of claim 1, wherein computing the metric comprises applying at least one weight to at least one of the parameters, calculating at least one dot product for the at least one weight and the at least one parameter, and generating a sum of the at least one dot product and the parameters that are not associated with the at least one weight.

10. A non-transitory computer-readable medium having computer instructions stored thereon that are executable by a processing device to perform operations for determining an attack surface of software, the operations comprising:
generating a platform for testing at least one deployment of software code;
identifying protocols that are used by the at least one deployment;
mapping the protocols to at least one port in the at least one deployment;
performing a static analysis of the at least one deployment to determine modules of the software code in the at least one deployment that open ports and deploy the protocols;
determining a plurality of parameters that correspond to the at least one deployment based on the static analysis and based on the mapping of the protocols, wherein the plurality of parameters indicate an attack surface vulnerability of the at least one deployment and include a number of unused ports in the at least one deployment, a number of open ports in the at least one deployment, information about at least one protocol used by the at least one deployment, a volume of traffic transmitted to external internet protocol addresses (IP) with respect to the at least one deployment, a number of choke points in the at least one deployment, a link traffic volume associated with the at least one deployment, and a mapping of protocols to nodes in the at least one deployment;
computing a metric for the at least one deployment based on the plurality of parameters, wherein the metric represents the attack surface vulnerability of the at least one deployment and wherein the at least one deployment includes a baseline deployment; and
normalizing the metric based on the baseline deployment.

11. The non-transitory computer-readable medium of claim 10, wherein the information about the at least one protocol used includes a first danger score for a first protocol that reflects whether the first protocol has a security hole and how long the first protocol has existed, a second danger score for a second protocol that reflects whether the second protocol has a security hole and how long the second protocol has existed, and a total danger score that includes a sum of the first danger score and the second danger score.

12. The non-transitory computer-readable medium of claim 10 wherein the operations further comprise:
collecting information related to network traffic at the at least one port in the at least one deployment; and
determining the plurality of parameters based on the information related to the network traffic.

13. The non-transitory computer-readable medium of claim 10, wherein the operations further comprise determining how much traffic is being communicated across certain links and wherein the link traffic volume is determined based on determining how much traffic is being communicated across the certain links and includes one or more of the following: an aggregate amount of link traffic, an average and maximum for each link, a first sum of all link traffic volumes, and a second sum of a ratio of all volumes.

14. The non-transitory computer-readable medium of claim 10, wherein the operations further comprise parsing and filtering irrelevant data.

15. The non-transitory computer-readable medium of claim 10, wherein:
the at least one deployment includes a first deployment that is a baseline deployment;
the at least one deployment includes a second deployment;
computing the metric for the at least one deployment includes computing a first metric for the first deployment and computing a second metric for the second deployment; and
the operations further comprise normalizing the second metric based on the first metric.

16. A method comprising:

identifying first protocols that are used by a first deployment of software code, wherein the first deployment is a baseline deployment;

identifying second protocols that are used by a second deployment of the software code;

mapping the first protocols to at least one first port in the first deployment;

mapping the second protocols to at least one second port in the second deployment;

performing a first static analysis of the first deployment to determine first modules of the software code in the first deployment that open ports and deploy the first protocols;

performing a second static analysis of the second deployment to determine second modules of the software code in the second deployment that open ports and deploy the second protocols;

determining a plurality of first parameters that correspond to the first deployment based on the first static analysis and based on the mapping of the first protocols, wherein the plurality of first parameters indicate a first attack vulnerability of the first deployment and include a first number of unused ports in the first deployment, a first number of open ports in the first deployment, first information about at least one first protocol used, a first volume of traffic transmitted to external internet protocol addresses (IP) with respect to the first deployment, a first number of choke points in the first deployment, a first link traffic volume associated with the first deployment, and a first mapping of first protocols to first nodes in the first deployment;

determining a plurality of second parameters that correspond to the second deployment based on the second static analysis and based on the mapping of the second protocols, wherein the plurality of second parameters indicate a second attack vulnerability of the second deployment and include a second number of unused ports in the second deployment, a second number of open ports in the second deployment, second information about at least one second protocol used, a second volume of traffic transmitted to external internet protocol addresses (IP) with respect to the second deployment, a second number of choke points in the second deployment, a second link traffic volume associated with the second deployment, and a second mapping of second protocols to second nodes in the second deployment;

computing a first metric for the first deployment based on the plurality of first parameters; computing a second metric for the second deployment based on the plurality of second parameters; and normalizing the second metric based on the first metric.

* * * * *